US006685458B2

(12) United States Patent
Poynor

(10) Patent No.: US 6,685,458 B2
(45) Date of Patent: Feb. 3, 2004

(54) SPLIT METAL DIE ASSEMBLY WITH INJECTION CYCLE MONITOR

(75) Inventor: Raymond Poynor, Oceanside, CA (US)

(73) Assignee: Acushnet Company, Fairhaven, MA (US)

( * ) Notice: Subject to any disclaimer, the term of this patent is extended or adjusted under 35 U.S.C. 154(b) by 220 days.

(21) Appl. No.: 09/975,056

(22) Filed: Oct. 11, 2001

(65) Prior Publication Data

US 2003/0072831 A1 Apr. 17, 2003

(51) Int. Cl.⁷ .............................. B29C 45/78; G07C 3/10
(52) U.S. Cl. ..................... 425/145; 377/15; 377/25; 425/170
(58) Field of Search .................... 264/40.6; 425/143, 425/144, 145, 136, 170; 377/15, 25

(56) References Cited

U.S. PATENT DOCUMENTS

| | | | |
|---|---|---|---|
| 2,632,207 A | 3/1953 | Mahla | |
| 2,786,234 A | 3/1957 | Beyer | |
| 3,178,109 A | * 4/1965 | Farrell et al. | 235/91 R |
| 3,321,973 A | 5/1967 | Anderson | 73/359 |
| 3,339,227 A | 9/1967 | Ehrenfreund | |
| 3,494,199 A | 2/1970 | Stacey | 73/361 |
| 3,583,467 A | 6/1971 | Bennett | 164/4 |
| 3,597,794 A | * 8/1971 | Mann | 425/140 |
| 3,659,974 A | * 5/1972 | Neugroschl | 425/135 |
| 3,728,058 A | * 4/1973 | Wheeler | 425/144 |
| 3,870,444 A | 3/1975 | Herron | 425/143 |
| 3,931,847 A | 1/1976 | Terkelsen | 164/4 |
| 3,953,718 A | 4/1976 | Cooke | 235/156 |
| 4,130,753 A | 12/1978 | Wade | 219/492 |
| 4,208,176 A | 6/1980 | Salerno | 425/139 |
| 4,213,494 A | 7/1980 | Carbonnel | 164/4 |
| 4,274,823 A | 6/1981 | Stanciu et al. | 425/145 |
| 4,326,326 A | 4/1982 | MacDonald | 29/428 |
| 4,354,812 A | 10/1982 | Wieder et al. | 425/144 |
| 4,420,446 A | 12/1983 | Wieder et al. | 264/40.6 |
| 4,493,362 A | 1/1985 | Moore et al. | 164/457 |
| 4,674,053 A | 6/1987 | Bannai et al. | |
| 4,798,692 A | 1/1989 | Blersch et al. | 264/40.6 |
| 4,816,197 A | 3/1989 | Nunn | 264/40.6 |
| 4,823,274 A | 4/1989 | Kiya et al. | |
| 4,841,459 A | 6/1989 | Ikeda et al. | |
| 4,890,306 A | 12/1989 | Noda | 377/15 |
| 4,899,288 A | 2/1990 | Tsutsumi | |
| 4,911,629 A | 3/1990 | Fujita | 425/135 |
| 4,971,547 A | 11/1990 | Nett, Jr. et al. | 425/135 |

(List continued on next page.)

FOREIGN PATENT DOCUMENTS

| | | |
|---|---|---|
| DE | 3607354 | 9/1987 |
| DE | 4323465 | 1/1995 |
| JP | 60006426 | 1/1985 |
| JP | 3222709 | 10/1991 |
| JP | 4148912 | 5/1992 |
| JP | 5024085 | 2/1993 |
| JP | 7001534 | 1/1995 |
| JP | 7186227 | 7/1995 |
| JP | 7308948 | 11/1995 |
| JP | 9169047 | 6/1997 |
| JP | 9193225 | 7/1997 |
| JP | 11105093 | 4/1999 |
| JP | 11179776 | 7/1999 |

*Primary Examiner*—Jill L. Heitbrink

(57) ABSTRACT

A die assembly for forming wax patterns is provided, including at least two cooperating mold portions together defining a main cavity, a runner in communication with the main cavity, a temperature sensor disposed proximate the runner, and a counter coupled to a mold portion and connected to the temperature sensor. When wax is injected through the runner into the main cavity, the temperature sensor measures an increase in temperature and the counter registers an injection cycle. An injection molding method also is provided with injection cycle counting.

16 Claims, 3 Drawing Sheets

U.S. PATENT DOCUMENTS

| | | | |
|---|---|---|---|
| 4,989,992 A | 2/1991 | Piai | 374/141 |
| 5,017,315 A | 5/1991 | Kumazaki | 264/40.1 |
| 5,062,052 A | 10/1991 | Sparer et al. | |
| 5,062,053 A | 10/1991 | Shirai et al. | |
| 5,062,784 A | 11/1991 | Inaba et al. | 425/143 |
| 5,191,539 A | 3/1993 | Harada et al. | |
| 5,194,197 A | 3/1993 | Munk et al. | 264/40.1 |
| 5,205,969 A | 4/1993 | Nett, Jr. et al. | 264/40.4 |
| 5,206,033 A | 4/1993 | Stastny | 425/143 |
| 5,210,698 A | 5/1993 | Topmiller | |
| 5,229,952 A | 7/1993 | Galloway et al. | |
| 5,246,643 A | 9/1993 | Inaba et al. | 264/40.1 |
| 5,261,806 A | 11/1993 | Pleasant | 425/144 |
| 5,316,707 A | 5/1994 | Stanciu et al. | 264/40.1 |
| 5,322,654 A | 6/1994 | Crawford et al. | 264/40.1 |
| 5,344,301 A | 9/1994 | Kamiguchi et al. | 425/169 |
| 5,360,329 A | 11/1994 | Lemelson | 425/143 |
| 5,361,826 A | 11/1994 | Yamauchi et al. | 164/457 |
| 5,452,335 A * | 9/1995 | Slater et al. | 377/25 |
| 5,484,008 A | 2/1996 | Thompson | 164/338.1 |
| 5,525,050 A | 6/1996 | Takizawa et al. | 425/143 |
| 5,539,650 A | 7/1996 | Hehl | |
| 5,571,539 A | 11/1996 | Starkey | 425/135 |
| 4,674,555 A | 6/1997 | Plata | 164/150 |
| 5,762,839 A | 6/1998 | Kamiguchi et al. | 264/40.6 |
| 5,894,005 A | 4/1999 | Steel et al. | 264/40.1 |
| 6,000,831 A | 12/1999 | Triplett | |
| 6,036,897 A | 3/2000 | Nugent | 264/40.6 |
| 6,065,954 A | 5/2000 | McFerrin et al. | 425/144 |
| 5,359,531 A1 | 10/2001 | Iwamoto et al. | |
| 6,377,649 B1 * | 4/2002 | Stuart | 377/15 |

* cited by examiner

SPLIT METAL DIE ASSEMBLY WITH INJECTION CYCLE MONITOR

FIELD OF THE INVENTION

The present invention relates to the production of wax molds for use in casting. In particular, the invention is related to an apparatus and method for measuring the service life of a metal die, used to produce wax molds, as a function of the number of wax injections to which the die is subjected.

BACKGROUND OF THE INVENTION

Investment casting, specifically, "lost wax" casting, is an industrial process used in the production of cast parts which involves the steps of: (1) injecting wax or other suitable polymer into a metal die to produce a pattern or mold, (2) removing the mold from the die, (3) coating the mold with a ceramic shell, (4) heating the shell to melt and remove the wax or polymer, and (5) subsequently filling the ceramic shell with molten metal.

The lost wax process begins with the production of a heat-disposable mold. The molds are usually made by injecting wax or other polymer into a metal die. Upon cooling, the metal die is opened and the mold is removed. This process is repeated until the desired number of molds are produced.

Typically, each mold will include one or more gates, which are generally flat or rod-like wax or polymer projections that attach the mold to a sprue. A sprue is a wax or polymer connector used to fasten the molds together to form a cluster.

Next, the cluster is dipped into an investment liquid, typically in the form of a ceramic slurry. The excess slurry is drained off and the cluster of molds is coated with a fine ceramic sand and dried. On successive dips, progressively coarser grades of ceramic material are applied, until a self-supporting shell is formed encapsulating the cluster.

The coated cluster is then placed in a furnace or steam autoclave where the wax or polymer, including the molds, gates, and sprues, melt and flow out of the mold. Since wax is combustible, the wax instead may be heated and burned out, and in such case vents are provided to permit gases to escape. The resulting ceramic mold corresponds to the shape of the cluster, with each mold in the cluster having precisely shaped hollow regions or cavities corresponding to the desired configuration of a finished part. The ceramic mold is then fired to burn out any remaining wax or polymer and to preheat the mold in preparation for the casting operation. The hot mold is taken from the furnace and molten metal is immediately poured into it.

After the metal-filled mold has cooled, the ceramic mold material is removed from the casting cluster by any suitable method; for example, sandblasting, mechanical vibration, or chemical cleaning may be employed. Individual castings are then severed from the cluster and any remaining protrusions left by gates or sprues are removed by chasing or other suitable finishing methods. The casting is then ready for any secondary operations, including heat treating, machining, and straightening.

Investment casting permits a high volume of production from a single metal die through the use of wax or polymer molds. For very large parts, a cluster may carry a single pattern and for smaller parts, a cluster may consist of many individual molds. Investment casting also permits the consistent reproduction of features having a high degree of complexity, and thus the finished parts may be given highly detailed and geometrically complex surfaces. The highly accurate reproduction process can obviate the need for the substantial machining operations that would otherwise be required to impart such detail.

Metal dies, however, have a life expectancy, as do all other casting parts, whereupon continued use of the metal die after a certain number of uses or cycles results in nonconforming castings. Because the metal dies are thermally cycled, fatigue-related failures may occur. In addition, the repeated use and stressing of the dies may result in slight or substantial changes in die dimensions that are outside permissible tolerances for production. In particular, in the case of the lost wax process, changes to the die may result in the creation of wax or polymer molds that do not meet the specifications and tolerances required for the final product.

Various controls have been developed for molding machinery. For example, U.S. Pat. No. 4,208,176 to Salerno discloses a time independent cycle control for plastic injection molding machines. Transducers are employed to monitor pressure and/or temperature within the mold cavity and when these parameters reach predetermined magnitudes, switching from stage to stage of the molding machine cycle ensues.

U.S. Pat. No. 5,571,539 to Starkey discloses a mold with an on-board counter or monitor. The counter is actuated with each opening and closing cycle of the mold to maintain a count of the operating cycles performed. The counter or stroke monitor may be either a mechanical counter or an electrical counter which is incorporated into a mold half to remain with the mold when it is stored away from a molding machine, when operated during an initial set-up operation, and when operated during a production run, and is hermetically sealed. An actuating mechanism is associated with the counter and secured to one of the mold halves so that the actuating mechanism causes the counter to advance and register a count with each molding cycle.

In addition, U.S. Pat. No. 5,361,826 to Yamauchi et al. discloses a laminar flow injection molding apparatus and method capable of directly judging flow mode of molten metal flowing into a metal mold as being either a laminar flow mode or a turbulent flow mode. If the molten metal has laminar flow, the casting operation is continued, and if the molten metal has turbulent flow, valve opening degree of a hydraulic circuit is re-adjusted. Molten metal detection means is disposed at least at one of the runner portion, the cavity and the gas vent passage for generating a molten metal detection signal each time the molten metal contacts the detection means in single injection.

Furthermore, U.S. Pat. No. 5,246,643 discloses a discrimination method for maintenance timing for injection molding machines. During the execution of one molding cycle by means of each injection molding machine, the respective values of various process parameters, such as molding cycle time, are cyclically detected, and the detected parameter values are loaded as candidate monitor data into a memory of a numerical control device. A molding monitor unit intermittently receives the various process parameter values associated with each injection molding machine as monitor data values, and discriminates the occurrence of deterioration of the various expendable parts of each injection molding machine by the input monitor data values.

Despite these developments, there exists a need for an apparatus and method for monitoring the service life of metal dies, and for indicating when a die has reached its life expectancy. There further exists a need for an apparatus and method that permit the monitoring of a bulk production operation to automatically monitor the number of injection cycles that a die has undergone, and to automatically terminate the injecting process when a preset service life has been reached. In particular, there exists a need for an apparatus and method for monitoring the usage of a metal die without manual inspection.

SUMMARY OF THE INVENTION

The present invention is related to a die assembly for forming wax patterns. The die assembly includes at least two cooperating mold portions together defining a main cavity, a runner in communication with the main cavity, a temperature sensor disposed proximate the runner, and a counter coupled to a mold portion and connected to the temperature sensor. When wax is injected through the runner into the main cavity, the temperature sensor measures an increase in temperature and the counter registers an injection cycle. In some embodiments, the mold portions are formed of aluminum, the main cavity is at least partially formed of aluminum epoxy and resin, and the main cavity is formed in substantially the shape of a golf club head. The temperature sensor may be a thermocouple, and the counter may be a digital counter. The wax may be injected between about 120° F. and about 200° F.

The counter may be a totalizer-type counter. An alarm connected to the counter may be triggered when a preset number of injection cycles are registered by the counter. The alarm may be at least one of a visual alarm and audio alarm. The counter may include a display for showing the number of cycles registered by the counter, and also may include a reset function for resetting the number of cycles to zero, a lockout function for preventing unauthorized resetting of the counter, and a memory function for storing the number of cycles registered. The counter may be demountably attached to the mold portion.

A valve may be provided in communication with the runner, the valve having open and closed positions, and when a preset number of cycles are registered, the valve may be closed to prevent further injections of wax into the die assembly.

The present invention also is related to an injection molding method including: injecting a flowable polymer into a mold cavity; sensing mold temperature proximate the mold cavity; comparing the mold temperature to a first preselected temperature and a second preselected temperature, the first preselected temperature being different from the second preselected temperature; and registering a count when the mold temperature reaches the first preselected temperature and subsequently reaches the second preselected temperature.

In one embodiment, the method further includes comparing the number of registered counts to a preselected count limit, and preventing flow of polymer to the mold cavity when the number of registered counts exceeds the preselected count limit. In another embodiment, the method further includes comparing the number of registered counts to a preselected count limit, and activating an alarm when the number of registered counts exceeds the preselected count limit. The alarm may be at least one of an audio alarm and a visual alarm.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE PREFERRED EMBODIMENTS

Figure 1:
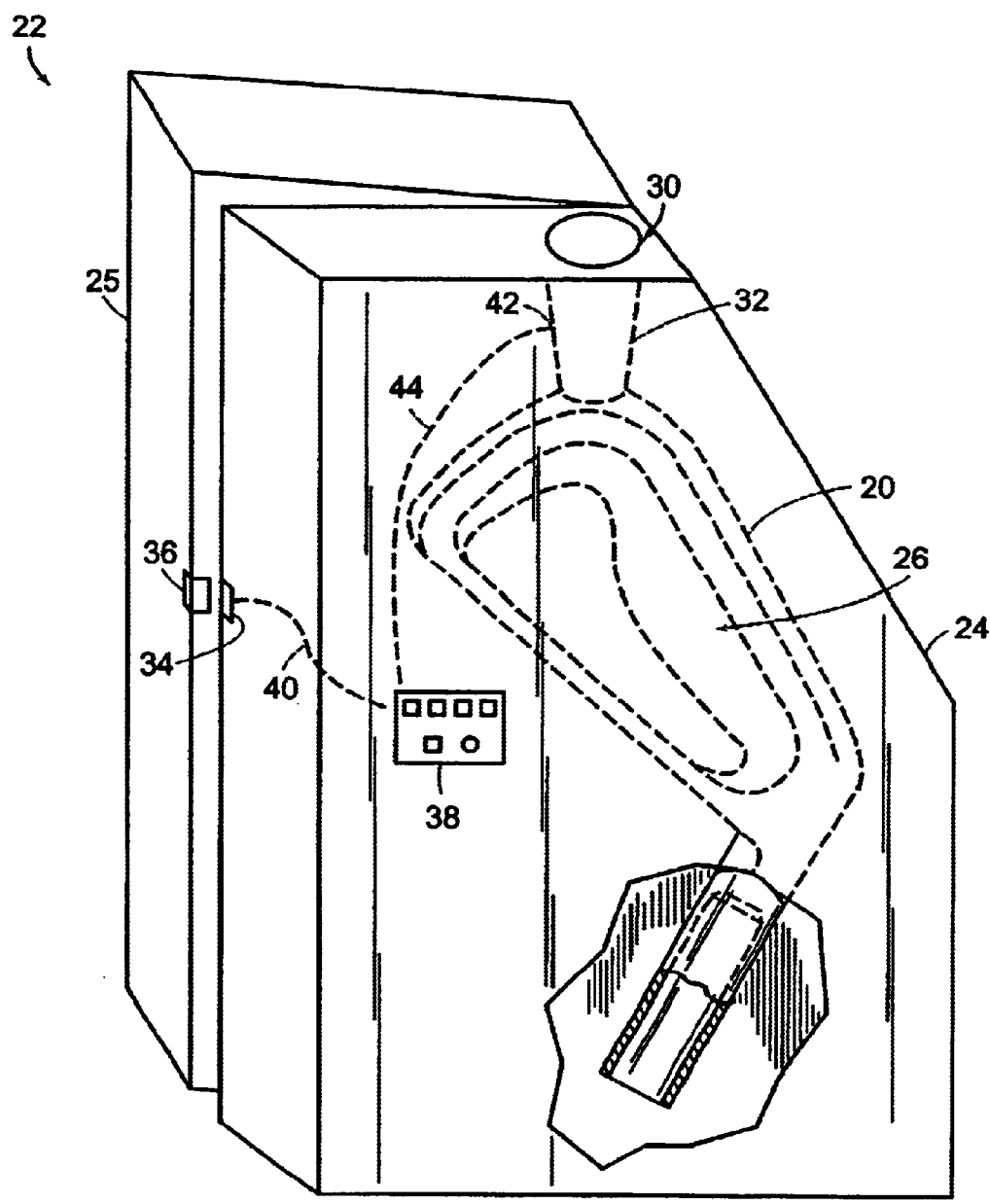
FIG. 1 is a perspective view, in partial cross-section, showing a split metal die assembly of the present invention.

Referring to FIG. 1, a wax mold in the shape of an exemplar iron golf club head 20 is produced using cooperating halves of a split metal die assembly 22. Although iron golf club head 20 is depicted, the present invention also is applicable to other types of clubs including woods and putters. A rear die half 24 mates with a front die half 25 to create a cavity 26 in the shape of club head 20. While two die portions 24, 25 are shown in the present embodiment, alternate embodiments may use more than two die portions. In a preferred embodiment, die assembly 22 is formed of aluminum and cavity 26 is at least partially formed of aluminum epoxy and resin. Die assembly 22 is in communication with a runner, ending in a gate 30, through which melted wax flows for injection into cavity 26. After wax is injected into and fills cavity 26, a sprue 32 is created integrally with molded club head 20.

Each wax injection cycle may be counted so that the usage of metal die assembly 22 may be monitored. Monitoring components suitable for the present invention include mechanical interlocks as well as magnetic or electrical sensors disposed between dies halves 24, 25, such as components 34, 36 positioned in opposing relation on die halves 24, 25, respectively. Interlocking or contact between such components may be detected or otherwise sensed. Preferably, a counter 38 is coupled to a die half 24, 25, and may be removably attached thereto or permanently fixed. Counter 38 receives signals from components 34, 36 through interconnection 40, and records each opening and/or closing of die halves 24, 25 with respect to each other. In particular, each time a wax club head 20 is formed between closed die halves 24, 25 of die assembly 22, die halves 24, 25 must be subsequently opened with respect to each other so that the wax club head 20 may be removed. After removal, another wax club head 20 may be formed when die halves 24, 25 are again closed with respect to each other. Preferably, counter 38 can be reset, and has a memory function to store cycle counts. Thus, should a counter 38 be removably attached to a die half 24, 25, it may be used with several die halves 24, 25 while still retaining memory of previous service lives of other die halves 24, 25.

Alternatively, a temperature sensor such as a thermocouple 42 may be provided in the vicinity of gate 30 and its respective runner, to permit measurement of temperature variations during wax injection cycling. Thermocouple 42 provides signals to counter 38 by interconnection 44, and the change in surface temperature proximate sprue 32 during wax injection is used as the indicator that a cycle has occurred and should be counted.

Counter 38 also may be wired to a solenoid valve in communication with a runner and gate 30, such that when a preset number of counts is reached, further injection of wax into die assembly 22 is prevented. Reset of counter 38 may again permit injections to proceed; counter 38 may be reset to count a different number of cycles, such as a smaller number, before again closing the solenoid valve. In addition, an alarm such as a sound alarm or a visual alarm may be activated when a preset value of counts is reached. Security features such as a lockout may be provided to prevent unauthorized resetting of counter 38. Such features may be a passkey or other code input using a keypad. Alternatively, a physical key may be required to reset the counter.

Preferably, a commercially available counter 38 includes a computer with a signal-conditioning circuit. Counter 38 serves as a totalizer, receiving and processing signals to count the accumulated total amount of cycles of injections, corresponding to the number of wax club heads 20 produced with die assembly 22. The totalizer provides a visual display, preferably in electronic digital format, of the accumulated total amount of cycles. Such totalizers are commercially available. Other types of counting may also be used, such as the volume of wax material that flows through a runner and gate 30, or the flow rate of material at a given location in a runner or gate 30.

Figure 2:
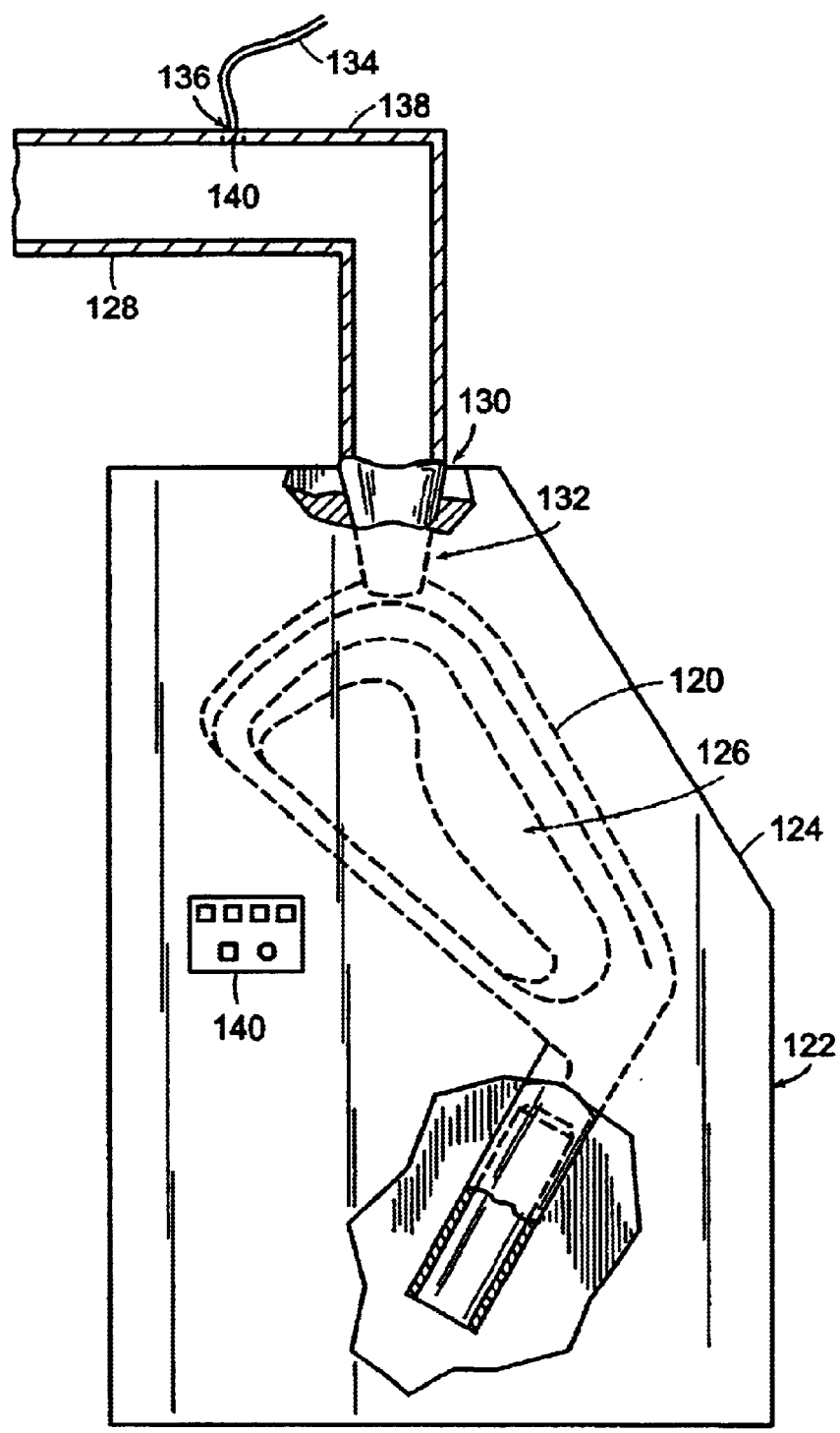
FIG. 2 is a side view, in partial cross-section, showing another split metal die assembly of the present invention.

Turning to FIG. 2, a wax mold in the shape of an exemplar iron golf club head 120 is produced using cooperating halves of a split metal die assembly 122. A rear die half 124 is depicted, and mates with a front die half (not shown) to create a cavity 126 in the shape of club head 120. Die assembly 122 is in communication with a runner 128 through which melted wax flows for injection into cavity 126. Runner 128 ends in a gate 130. After wax is injected into and fills cavity 126, a sprue 132 is created integrally with molded club head 120. A temperature sensor such as a thermocouple 134 is preferably provided in the vicinity of runner 128 to permit measurement of temperature variations during wax injection cycling. In one embodiment, a hole 136 is provided in runner 128 to permit insertion of thermocouple 135 into the wall 138 of runner 128, where it is sealed in place. Thermocouple 134 includes a measuring junction 140 that is permitted to contact flowing wax in runner 128. In alternate embodiments, other temperature sensing devices may be used such as resistance temperature detectors (RTDs), thermistors, and infrared temperature measurement instruments. In addition, thermocouple 135 may be placed on the outside surface of runner 128 or in a recessed region, obviating the need for a hole 136 in runner 128. The change in surface temperature on the outside surface of runner 128 may be a sufficient indicator of the occurrence of an injection cycle. Preferably, a counter 140 is coupled to a die half such as die half 124, and may be removably attached thereto or permanently fixed. Counter 140 is interconnected to thermocouple 134 to receive signals from it, and records each injection cycle.

Figure 3:
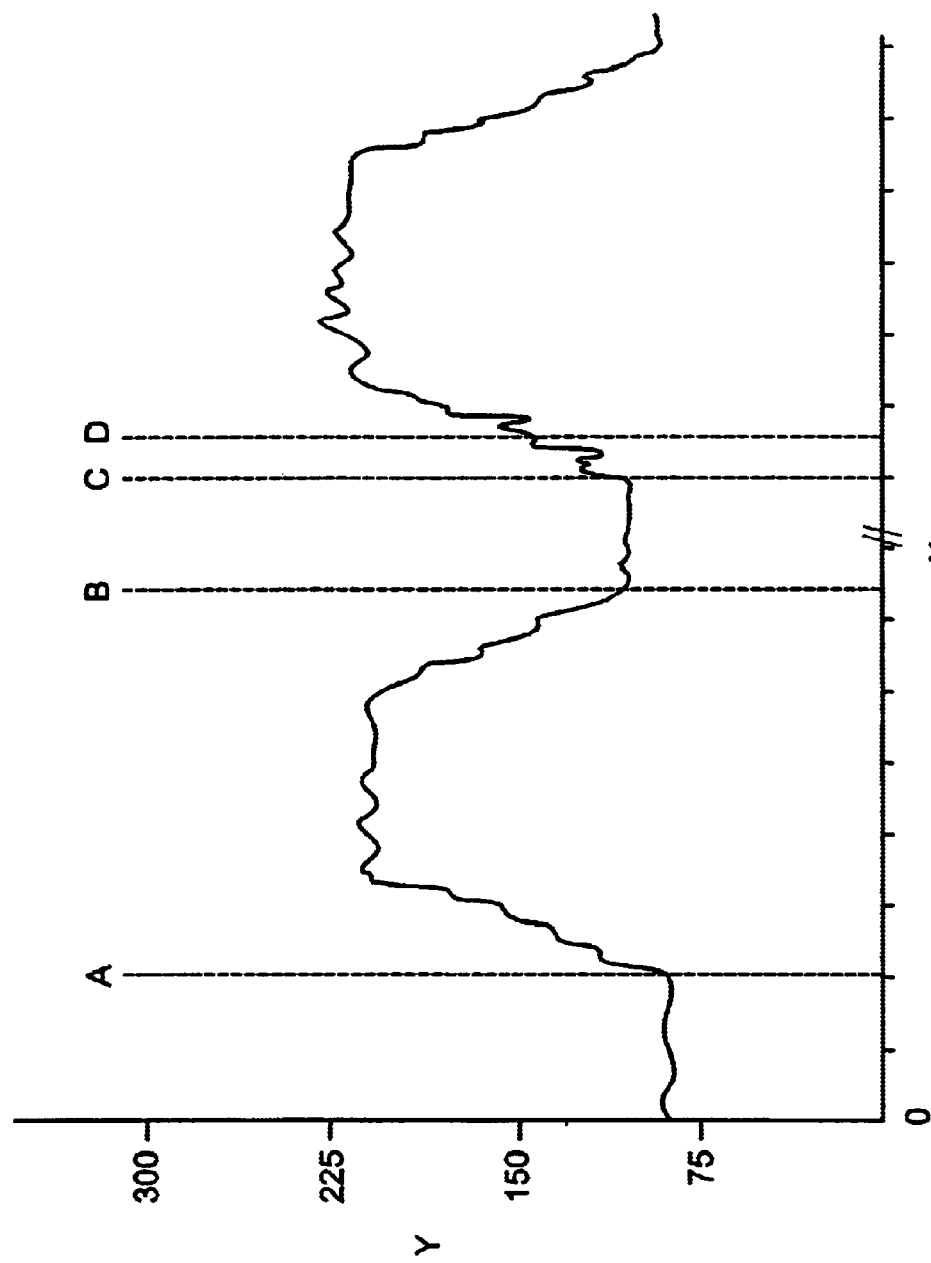
FIG. 3 is a plot of temperature as a function of time for two cycles of wax injection.

When wax is injected through runner 128, the temperature increase within runner 128 is monitored using thermocouple 134. Thus, a rise in temperature of a know amount or to a know level indicates that wax has been injected, and the die assembly 122 is being used for a new cycle. Wax is typically injected at between about 120° F. and about 200° F., temperatures that are distinctly higher than standard room temperature. One complete injection cycle occurs when a predetermined amount of wax has been injected; before the cycle and after the cycle, runner 128 cools due to the lack of flowing polymer therein. A plot of temperature, Y, as a function of time, X, for two cycles of wax injection is shown in FIG. 3. As shown in the plot, prior to the beginning of an injection cycle at time A, no wax flows in runner 128 and its temperature as measured with thermocouple 134, for example, remains near room temperature. Between time A and time B, as wax is injected through runner 128, thermocouple 134 measures a significant increase in temperature of runner 128 followed by a decrease as cavity 126 and sprue 130 are completely filled with wax and injection is completed. A lag time next occurs between time B and time C, as the wax mold is removed from die assembly 122. Then, after the die halves are brought together again, another injection cycle commences.

As can be seen during the period between time C and time D, thermocouple 134 may sense some decreases in temperature as instabilities occur in the wax flow. Alternatively, data collection from thermocouple 134 may be noisy during a period such as shown between time C and time D, and thus adequate data filtering must be provided when measuring the passage of a complete cycle so that multiple cycles are not counted when only one cycle has actually occurred. Also, to prevent multiple counts for a single injection cycle, the counter may register a count once a temperature near the injection temperature is first reached; a new count only may be registered after a significantly lower temperature is reached, and the injection temperature is again sensed. For example, a count may be registered when a temperature of 150° F. is first reached, and the count is "completed" when a temperature of 120° F. is reached during cooling. Another count is registered when the temperature of 150° F. is again reached. Depending on the expected temperature behavior of the wax injection, the difference between the preset temperature expected during injection and the preset temperature expected during cooling may be more or less than the aforementioned example of a 30° F. difference. The counter may be selectably programmed to register a count when a first temperature is reached, and then remain in standby, without registering additional counts, until a second temperature is reached.

In accordance with the present invention, one or more count sensors or interlocks, such as temperature sensors, may output information regarding cycles in an analog signal form. For example, the changing mold temperature initially may be provided in an analog signal form. In such a setup, the analog signal is provided through sensor circuitry, from the temperature sensor to an analog to digital converter. The analog to digital converter receives the analog signal and converts the analog signal to a digital form. The digital signal is then sent to a digital counter, which interprets the digital signal in the form of temperature values. The sensed temperature change of the mold and the corresponding temperature values then may be compared to preselected temperature values that are stored in the digital counter. The first preselected temperature value stored in the digital counter may be a temperature value that indicates the presence of a polymer injection in the mold. As the sensed temperature of the mold and the corresponding temperature values meet or exceed the first preselected temperature value, the digital counter counts a single count value. The second preselected temperature value is a temperature value that indicates the polymer from the polymer injection has sufficiently cooled and is ready for removal from the mold. As the sensed temperature of the mold and the corresponding temperature values reach or decrease below the second preselected temperature value, the digital counter adds the count value to any previously stored count value and stores the new count value. This new count value reflects the number of times the mold has been subjected to polymer injections. The digital counter then resets itself to begin comparing sensed temperature values from the next polymer injection. Thus, if two counts are made for each injection— one count for reaching an initial temperature and another count for a final, cooler temperature, two counts are then equivalent to one cycle of injection, forming one wax golf club head.

Through the use of such a counting system, an operator of the molding machine can track the usage of a metal die assembly. Because the operator may desire to switch or remachine mold halves after a particular number of cycles, the counting system may be used by an operator to determine when such a cycle value has been reached.

In alternate embodiments, the counting system of the present invention may be used to determine the number of cycles to failure of the mold halves. Thus, in a molding operation, it may be possible to accurately determine the anticipated service life of mold halves. Operators may then be able to anticipate the frequency of equipment changes and mold production costs.

In another embodiment of the present invention, a digital counter for use with the die assembly is provided with a user interface and display, so that counts may be displayed indicating the number of times the mold has been used. A variety of display formats may be used, including the number of times the mold has been used over a given time frame or the number of times the mold has been used since initial installation. The user interface also may allow an operator to reset the counter at any given time and may allow the operator to enter notations to be stored in the digital counter along with count values. Such notations may include observations about mold quality or other factors that influenced the molding operation at a particular count value.

An injection molding method also is provided in which the number of injections are monitored using a temperature sensor. A flowable polymer is injected into a mold cavity, and mold temperature is sensed proximate the mold cavity. The mold temperature is compared to a first preselected temperature and a second preselected temperature, with the first preselected temperature being different from the second preselected temperature. A count is registered when the mold temperature reaches the first preselected temperature and subsequently reaches the second preselected temperature. In a preferred embodiment, the number of registered counts is compared to a preselected count limit, and flow of polymer to the mold cavity is prevented when the number of registered counts exceeds the preselected count limit. Alternatively, the number of registered counts is compared to a preselected count limit, and at least one audio or visual alarm is activated when the number of registered counts exceeds the preselected count limit.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A die assembly for forming wax patterns, comprising:
   at least two cooperating mold portions together defining a main cavity;
   a runner in communication with the main cavity;
   a temperature sensor disposed proximate the runner;
   a counter coupled to a mold portion and connected to the temperature sensor,
   wherein when wax is injected through the runner into the main cavity, the temperature sensor measures an increase in temperature and the counter registers an injection cycle.

2. The die assembly of claim 1, wherein wax is injected between about 120° F. and about 200° F.

3. The die assembly of claim 1, wherein the mold portions are formed of aluminum.

4. The die assembly of claim 1, wherein the main cavity is at least partially formed of aluminum epoxy and resin.

5. The die assembly of claim 1, wherein the counter comprises a totalizer-type counter.

6. The die assembly of claim 1, further comprising an alarm connected to the counter, wherein the alarm is triggered when a preset number of injection cycles are registered by the counter.

7. The die assembly of claim 6, wherein the alarm is at least one of a visual alarm and audio alarm.

8. The die assembly of claim 1, wherein the counter comprises a display for showing the number of cycles registered by the counter.

9. The die assembly of claim 8, wherein the counter further comprises a reset function for resetting the number of cycles to zero.

10. The die assembly of claim 9, wherein the counter further comprises a lockout function for preventing unauthorized resetting of the counter.

11. The die assembly of claim 8, wherein the counter further comprises a memory function for storing the number of cycles registered.

12. The die assembly of claim 1, further comprising a valve in communication with the runner, the valve having open and closed positions, wherein when a preset number of cycles are registered, the valve is closed and further injections of wax into the die assembly are prevented.

13. The die assembly of claim 1, wherein the counter is demountably attached to the mold portion.

14. The die assembly of claim 1, wherein the temperature sensor is a thermocouple.

15. The die assembly of claim 1, wherein the counter is a digital counter.

16. The die assembly of claim 1, wherein the main cavity is formed in substantially the shape of a golf club head.

* * * * *